US012811447B2

(12) United States Patent
Peng et al.

(10) Patent No.: US 12,811,447 B2
(45) Date of Patent: Nov. 24, 2026

(54) VARIABLE-POLE PERMANENT MAGNET MACHINE

(71) Applicant: GM GLOBAL TECHNOLOGY OPERATIONS LLC, Detroit, MI (US)

(72) Inventors: Peng Peng, Rochester Hills, MI (US); Le Chang, Shelby Township, MI (US); Alireza Fatemi, Canton, MI (US); Thomas W. Nehl, Shelby Township, MI (US); Chandra S. Namuduri, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 216 days.

(21) Appl. No.: 18/911,699

(22) Filed: Oct. 10, 2024

(65) Prior Publication Data

US 2026/0106500 A1 Apr. 16, 2026

(51) Int. Cl.
*H02K 1/276* (2022.01)
*H01F 13/00* (2006.01)

(52) U.S. Cl.
CPC .......... *H02K 1/276* (2013.01); *H01F 13/003* (2013.01); *H02K 2213/09* (2013.01)

(58) Field of Classification Search
CPC .. H02K 1/276; H02K 2213/09; H02K 1/2766; H02K 1/165; H02K 7/116; H02K 2213/03; H01F 13/003; H02P 21/22
See application file for complete search history.

(56) References Cited

U.S. PATENT DOCUMENTS

| | | | | |
|---|---|---|---|---|
| 2010/0327689 A1* | 12/2010 | Sakai | ...................... | H02P 27/04 310/156.03 |
| 2018/0219463 A1* | 8/2018 | Sasaki | .................... | H02K 1/276 |
| 2021/0351646 A1* | 11/2021 | Chen | ...................... | H02K 1/276 |

FOREIGN PATENT DOCUMENTS

| | | | |
|---|---|---|---|
| CN | 102170212 A | 8/2011 |
| DE | 102018206478 A1 | 10/2019 |
| JP | 2014007853 A | 1/2014 |
| JP | 2015186415 A | 10/2015 |

* cited by examiner

*Primary Examiner* — Tulsidas C Patel
*Assistant Examiner* — Mohammed Ahmed Qureshi
(74) *Attorney, Agent, or Firm* — Quinn IP Law

(57) ABSTRACT

A variable-pole radial flux electric machine includes a stator having a radially inner stator surface and stator windings arranged thereon and a rotor mounted inside the stator and configured to rotate relative thereto. The rotor includes a rotor core defined by a rotor outer surface establishing an airgap between the rotor and the stator. The rotor also includes an N-number of magnetic poles each having at least one permanent magnet set in the rotor core and configured to generate magnetic flux. An N/2-number of the magnetic poles includes relatively high-coercivity magnets and an N/2-number of the magnetic poles includes relatively low-coercivity magnets. The relatively high-coercivity magnet poles and the relatively low-coercivity magnet poles are arranged in alternating order around the rotor core. The magnetization direction of the relatively low-coercivity magnets is changed via application of direct-axis current which alters the number of magnetic poles operating in the electric machine.

20 Claims, 5 Drawing Sheets

VARIABLE-POLE PERMANENT MAGNET MACHINE

INTRODUCTION

The disclosure relates to a variable-pole interior permanent magnet machine.

An electric motor is a machine that converts electric energy into mechanical energy. Electric motors may be configured as an alternating current (AC) or a direct current (DC) type. An electric motor's operation is based on an electromagnetic interaction between rotor magnetic field and stator magnetic field. Electric motor torque is commonly generated by the magnetic flux linkage between the field of the rotor magnetic poles and the electro-magnetic field of the stator.

Electric motors are generally classified into two categories based on the direction of the magnetic field—axial flux motors and radial flux motors. Electric motors may be synchronous and brushless, employing permanent magnets as poles for field excitation. Brushless radial flux motors may be configured as interior permanent magnet (IPM) or surface-mounted permanent magnet (SPM) machines. An IPM has its permanent magnets embedded and distributed inside the rotor core, while the permanent magnets of an SPM are arranged on the rotor surface.

SUMMARY

One aspect of the present disclosure is a variable-pole radial flux electric machine includes a stator having a radially inner stator surface and stator windings arranged thereon and a rotor mounted inside the stator and configured to rotate relative thereto about a rotational axis. The rotor includes a rotor core defined by a rotor outer surface establishing an airgap between the rotor and the stator. The rotor also includes an N-number of magnetic poles each having at least one permanent magnet set in the rotor core and configured to generate magnetic flux. An N/2-number of the magnetic poles includes relatively high-coercivity magnets resistant to change of magnetization direction and an N/2-number of the magnetic poles includes relatively low-coercivity magnets having variable direction of magnetization. The magnetic poles having the relatively high-coercivity magnets and the magnetic poles having the relatively low-coercivity magnets are arranged in alternating order around the rotor core. The magnetization direction of the relatively low-coercivity magnets is changed via application of direct-axis current ($i_d$) thereto which alters the number of magnetic poles operating in the electric machine.

Another aspect of the present disclosure is a torque regulation system including the variable-pole radial flux electric machine and an electronic controller configured to regulate operation of the variable-pole radial flux electric machine. The electronic controller is configured to change magnetization direction of the relatively low-coercivity magnets via application of direct-axis current ($i_d$) thereto to thereby alter the number of magnetic poles in the electric machine.

Yet another aspect of the present disclosure is a motor vehicle employing the torque regulation system for vehicle propulsion. In such an embodiment, the electronic controller is configured to generate an effective gear ratio change during the propulsion by altering the number of magnetic poles in the electric machine.

The electronic controller may be configured to reverse magnetization direction of the relatively low-coercivity magnets from being aligned with the magnetization direction of the relatively high-coercivity magnets via application of a positive direct-axis current ($i_d$) thereto and thereby reduce the number of magnetic poles operating in the electric machine from N to N/2.

The electronic controller may be configured to return magnetization direction of the relatively low-coercivity magnets to being aligned with the magnetization direction of the relatively high-coercivity magnets via application of a negative direct-axis current ($i_d$) thereto and thereby increase the number of magnetic poles operating in the electric machine from N/2 to N.

The electronic controller may be configured to change the magnetization direction of the relatively low-coercivity magnets based on a predetermined torque output of the electric machine.

The electronic controller may be configured to change the magnetization direction of the relatively low-coercivity magnets based on a predetermined rotating speed of the electric machine.

The coercivity of each relatively high-coercivity magnet may be greater than or equal to 1000 kA/m and the coercivity of each relatively low-coercivity magnet may be less than or equal to 520 kA/m.

The rotor core may include multiple adjacent rotor laminations arranged along the rotational axis. In such an embodiment, full magnetization of each relatively low-coercivity magnet may be achieved at a density of the magnetic flux that is lower than saturation density of the magnetic flux in the rotor laminations.

The magnetic poles having the relatively high-coercivity magnets and the magnetic poles having the relatively low-coercivity magnets may have a spatially or dimensionally asymmetrical configuration.

Each magnetic pole may include a plurality of permanent magnets and be defined by a U-shape characterized by a flat portion generated by at least one of the constituent permanent magnets.

In another embodiment, each magnetic pole may include a plurality of permanent magnets and be defined by a Δ-shape having a flat portion arranged proximate the airgap.

In another embodiment, each magnetic pole may include a plurality of permanent magnets and be defined by a V-shape.

The torque regulation system may further include a multiphase inverter regulated by electronic controller to generate the direct-axis current ($i_d$) for at least 1 millisecond. The direct-axis current ($i_d$) may be up to 3 times greater than peak current at maximum output torque of the electric machine.

The above features and advantages, and other features and advantages of the present disclosure, will be readily apparent from the following detailed description of the embodiment (s) and best mode(s) for carrying out the described disclosure when taken in connection with the accompanying drawings and appended claims.

DETAILED DESCRIPTION

Figure 1:
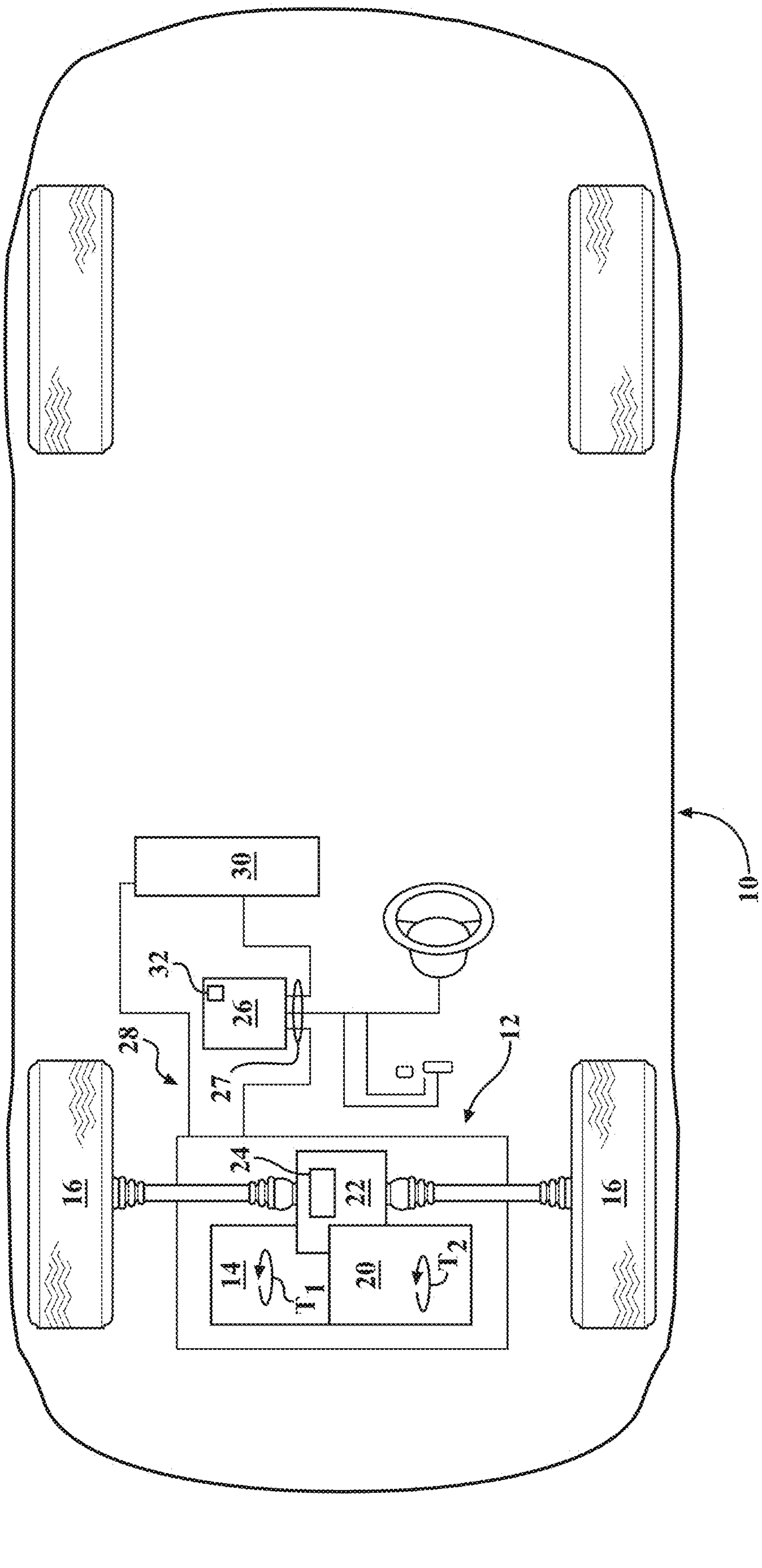
FIG. 1 is a schematic illustration of a motor vehicle having a powertrain employing a variable-pole radial flux electric machine providing vehicle propulsion, according to the disclosure.

Embodiments of the present disclosure as described herein are intended to serve as examples. Other embodiments may take various and alternative forms. Additionally, the drawings are generally schematic and not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Certain terminology may be used in the following description for the purpose of reference only, and thus are not intended to be limiting. For example, terms such as "above" and "below" refer to directions in the drawings to which reference is made. Terms such as "front", "back", "fore", "aft", "left", "right", "rear", "side", "upward", "downward", "top", and "bottom", etc., describe the orientation and/or location of portions of the components or elements within a consistent but arbitrary frame of reference, which is made clear by reference to the text and the associated drawings describing the components or elements under discussion. Furthermore, terms such as "first", "second", "third", and so on may be used to describe separate components. Such terminology may include the words specifically mentioned above, derivatives thereof, and words of similar import, and are used descriptively for the figures, and do not represent limitations on the scope of the disclosure, as defined by the appended claims.

Referring to FIG. 1, a motor vehicle 10 having a powertrain 12 is depicted. The motor vehicle 10 may include, but not be limited to, a commercial vehicle, industrial vehicle, passenger vehicle, aircraft, watercraft, train or the like. It is also contemplated that the motor vehicle 10 may be a mobile platform, such as an airplane, all-terrain vehicle (ATV), boat, personal movement apparatus, robot and the like to accomplish the purposes of this disclosure. The powertrain 12 includes a first power-source 14 depicted as an electric motor-generator and configured to generate a first power-source torque $T_1$ (shown in FIG. 1) for propulsion of the motor vehicle 10 via driven wheels 16 relative to a road surface. The motor-generator 14 is configured as a radial flux electric motor, where the magnetic flux is generated perpendicular to the motor's axis of rotation and the airgap between the machine's rotor and stator is arranged concentrically with the rotational axis.

As shown in FIG. 1, the powertrain 12 may also include a second power-source 20, such as an internal combustion engine configured to generate a second power-source torque $T_2$. The power-sources 14 and 20 may act in concert to power the motor vehicle 10 and be operatively connected to a transmission assembly 22. The transmission assembly 22 may be configured to transmit first and/or second power-source torques $T_1$, $T_2$ to a final drive unit 24, which in turn may be connected to the driven wheels 16. The first power-source 14 is a motor-generator or electric motor, which may, for example, be mounted to the second power-source 20, mounted to (or incorporated into) the transmission assembly 22, mounted to the final drive unit 24, or be a stand-alone assembly mounted to the structure of the vehicle 10. As shown, the motor vehicle 10 additionally includes a programmable electronic controller 26 configured to communicate via a high-voltage BUS 27 and control the powertrain 12 to generate a predetermined amount of power-source torque (sum of $T_1$ and $T_2$), and various other vehicle systems. The electronic controller 26 is mounted on the motor vehicle 10 and, being in operative communication with the power-sources 14 and 20, be part of a torque regulation system 28. Motor vehicle 10 additionally includes an energy storage system 30, such as one or more batteries, configured to generate and store electrical energy for powering the power-sources 14 and 20 and the electronic controller 26.

The electronic controller 26 may be a central processing unit (CPU) or a powertrain control module (PCM) configured to receive data signals from various vehicle sensors and regulate operation of vehicle propulsion. The electronic controller 26 includes a memory that is tangible and non-transitory. The memory may be a recordable medium that participates in providing computer-readable data or process instructions. Such a medium may take many forms, including but not limited to non-volatile media and volatile media. Non-volatile media used by the electronic controller 26 may include, for example, optical or magnetic disks and other persistent memory. Volatile media of each of the controller's memory may include, for example, dynamic random-access memory (DRAM), which may constitute a main memory. Such instructions may be transmitted by one or more transmission medium, including coaxial cables, copper wire and fiber optics, including the wires that comprise a system bus coupled to the vehicle systems.

Memory of the electronic controller 26 may also include a flexible disk, hard disk, magnetic tape, other magnetic medium, a CD-ROM, DVD, other optical medium, etc. The electronic controller 26 may be equipped with a high-speed primary clock, requisite Analog-to-Digital (A/D) and/or Digital-to-Analog (D/A) circuitry, input/output circuitry and devices (I/O), as well as appropriate signal conditioning and/or buffer circuitry. Algorithms required by the electronic controller 26 or accessible thereby, generally indicated via numeral 32, may be programmed in the controller, stored in the memory, and automatically executed to provide the required functionality, such as for operating the torque regulation system 28.

Figure 2:
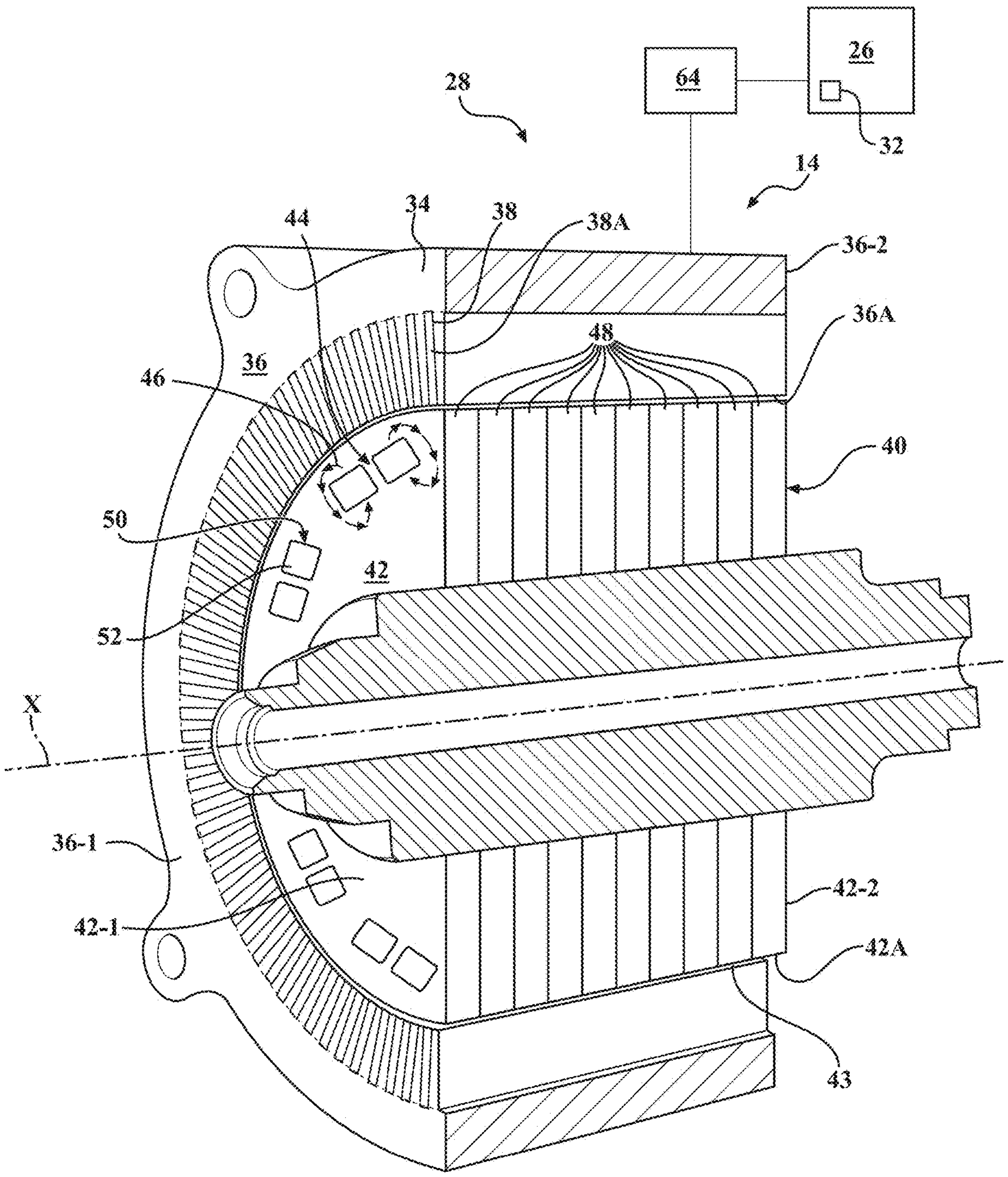
FIG. 2 is a schematic close-up partial cut-away perspective view of the variable-pole radial flux electric machine shown in FIG. 1, depicted as part of a torque regulation system, according to the disclosure.

FIG. 2 illustrates a general cross-section of the motor-generator 14 and is configured as a variable-pole radial flux electric machine, to be described in detail below. The motor-generator 14 includes a rotationally fixed stator 34 having a generally cylindrical core 36 and winding slots 38. As also shown in FIG. 2, the stator core 36 also has a radially inner stator core surface 36A. The motor-generator 14 additionally includes a rotor 40 arranged on a shaft defining a rotational axis X and thereby mounted for rotation inside the stator 34. The stator 34 may include multiphase AC windings or poles 38A arranged within the winding slots 38, wherein the windings receive multiphase AC from a power inverter (to be discussed below) to establish a rotating magnetic field exerting torque upon the rotor 40. The stator windings 38A are generally contained within the winding slots 38 with end turns of the windings extending beyond the limits of the cylindrical core 36 at axially opposite stator ends—a first end 36-1 and a second end 36-2.

The rotor 40 has a ferromagnetic rotor core 42. The rotor core 42 has axially opposite rotor core ends—a first end 42-1 and a second end 42-2—and is defined by a radially outer rotor surface 42A. The rotor core 42 also establishes an airgap 43 (shown in FIG. 2) between the stator 34 and its rotor outer surface 42A. The rotor core 40 may be constructed from a relatively soft magnetic material, such as laminated silicon or ferrous steel. The rotor 40 also includes an N-number of magnetic poles 44, each having at least one permanent magnet set in the rotor core 42 and configured to generate magnetic flux 46. Specifically, stacked rotor laminations 48 of the core 40 may include voids forming interior pockets 50 with one or more permanent magnets disposed or embedded therein, collectively defining particular magnetic poles 44. The variable-pole radial flux electric machine 14 may be an interior permanent magnet (IPM) or a surface-mounted permanent magnet (SPM) synchronous machine, as understood by those skilled in the art.

Figure 3:
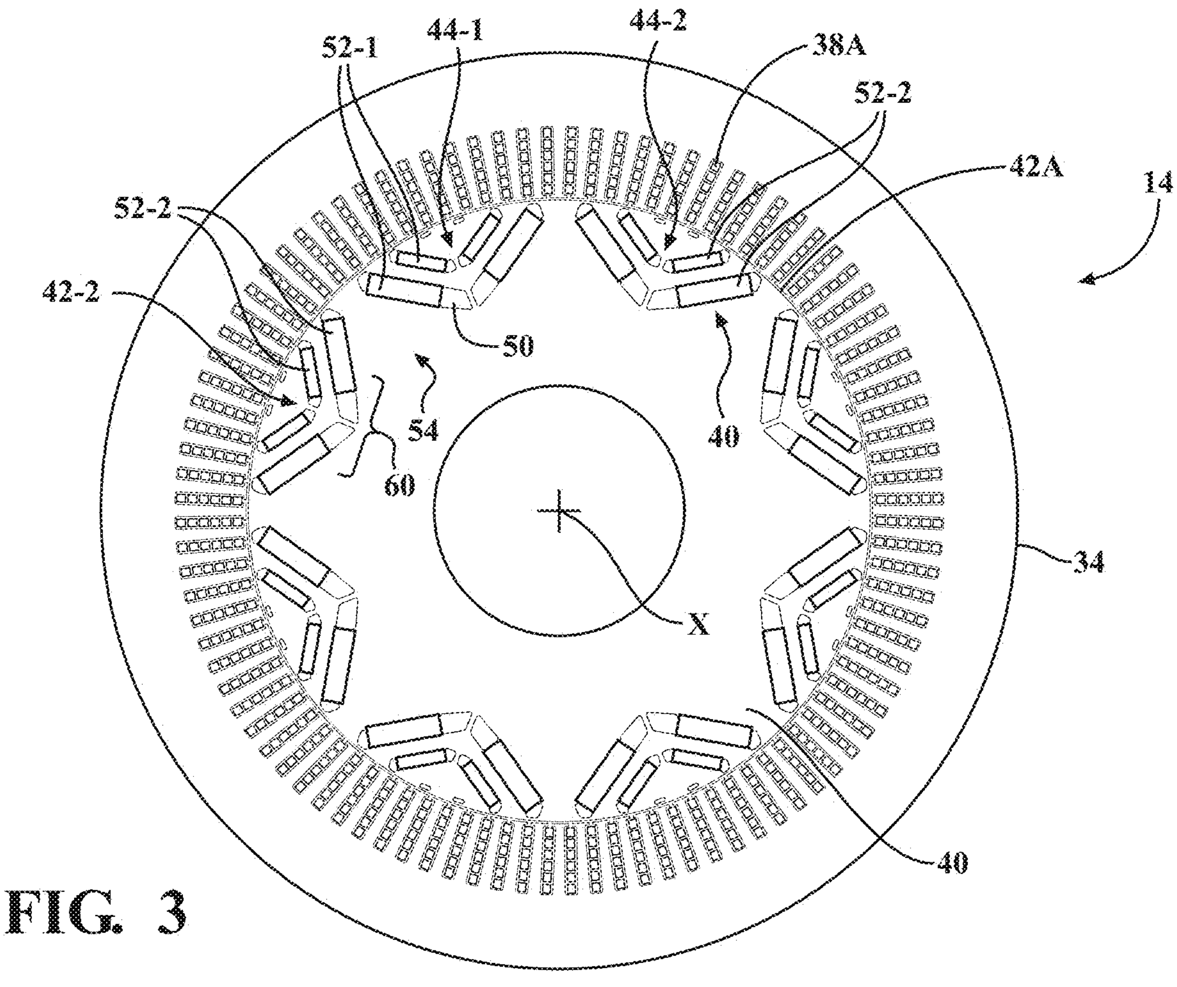
FIG. 3 is a schematic front view of the variable-pole radial flux electric machine shown in FIG. 2, depicting magnetic poles having alternating high-coercivity magnets and low-coercivity magnets arranged in a V-shape, according to an embodiment of the disclosure.

As shown in FIG. 3, an N/2-number of the magnetic poles 44 includes relatively high-coercivity magnets 52-1 that may withstand an external magnetic field without becoming demagnetized; each of these poles is identified by numeral 44-1. Additionally, the other N/2-number of the magnetic poles 44 includes relatively low-coercivity magnets 52-2 that would become demagnetized by a similar external magnetic field; each of these poles is identified by numeral 44-2. As shown, the magnetic poles 44-1 and the magnetic poles 44-2 are arranged in alternating order around the rotor core 40. Coercivity is usually measured in oersted or ampere/meter (A/m) units and is denoted as "$H_C$". The coercivity of each relatively high-coercivity magnet 52-1 may be greater than or equal to 1000 kA/m, such as for strong neodymium magnets. The coercivity of each relatively low-coercivity magnet may be less than or equal to 520 kA/m, such as for ferrite or Iron Nitride magnets.

Electronic controller 26 is configured to regulate rotating speed and torque output of the variable-pole radial flux electric machine 14. Specifically, electronic controller 26 is programmed, via a particular algorithm 32, to change magnetization direction of the relatively low-coercivity magnets 52-2. The magnetization direction of the relatively low-coercivity magnets 52-2 is changed via application of direct-axis (or d-axis) current ($i_d$) thereto through the stator windings 38A, which alters the number of magnetic poles operating in the electric machine 14. The variable-pole radial flux electric machine 14 may be configured such that full magnetization of each relatively low-coercivity magnet 52-2 is achieved at magnetic flux 46 density that is lower than the flux density required for saturation of the rotor laminations 48. Such a flux density relationship between the low-coercivity magnets 52-2 and the rotor laminations 48 is intended to facilitate saturation of the rotor core 40 with the magnetic flux 46 during pole changeover in the electric machine 14.

As understood, in a rotating electric machine, the d-axis and a quadrature axis (or q-axis) are two orthogonal electrical axial components that represent the direction of magnetic flux, current, and inductance. The d-axis is set in the direction of the magnetic flux of the permanent magnet pole and is electrically 90 degrees apart from the q-axis. Generally, when d-axis current ($i_d$) is positive, the stator current produces a magnetomotive force (MMF) around the air gap which intensifies the d-axis magnetic flux. On the other hand, if d-axis stator current ($i_d$) is set to a negative value (called field-weakening control), which allows the machine to run above its base speed. In traditional electric machines, field-weakening control can help achieve constant power at high speeds.

The electronic controller 26 may be configured to reverse magnetization direction of the relatively low-coercivity magnets 52-2 from being aligned with the magnetization direction of the relatively high-coercivity magnets 52-1 via application of a positive d-axis current ($i_d$) thereto. The subject application of positive d-axis current ($i_d$) is configured to reversibly demagnetize the relatively low-coercivity magnets 52-2 and magnetically reinforce the relatively high-coercivity magnets 52-1 to thereby reduce the number of magnetic poles 44 operating in the electric machine 14 from N to N/2 and generate an N/2-pole mode. The electronic controller 26 may be further configured to return magnetization direction of the relatively low-coercivity magnets 52-2 to being aligned with the magnetization direction of the relatively high-coercivity magnets 52-1 via application of a negative d-axis current ($i_d$) thereto. The subject application of negative d-axis current ($i_d$) is configured to re-magnetize the relatively low-coercivity magnets 52-2 and reestablish original magnetization of the relatively high-coercivity magnets 52-1 to thereby increase the number of magnetic poles operating in the electric machine from N/2 to N and generate an N-pole mode.

The electronic controller 26 may be configured to affect pole changeover, i.e., change magnetization direction of the relatively low-coercivity magnets 52-2, based on an operating point of the electric machine 14. Operating points of electric machine 14 may be determined in response to parameters detected via appropriate vehicle sensors (not shown) and/or calculated using empirically generated data. A particular pole changeover point may, for example, be defined by a predetermined output torque $T_1$.programmed into the electronic controller 26. Similarly, electronic controller 26 may be configured to affect the pole changeover based on a predetermined rotating speed of the electric machine 14.

Figure 4:
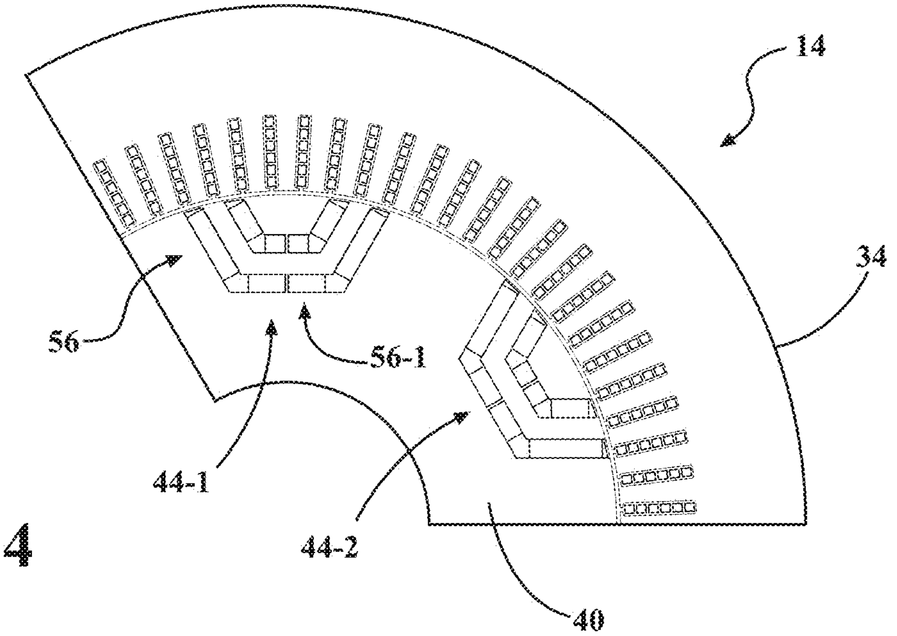
FIG. 4 is a schematic front view of the variable-pole radial flux electric machine shown in FIG. 2, depicting alternating high-coercivity magnets and low-coercivity magnets arranged in a U-shape, according to another embodiment of the disclosure.
Figure 5:
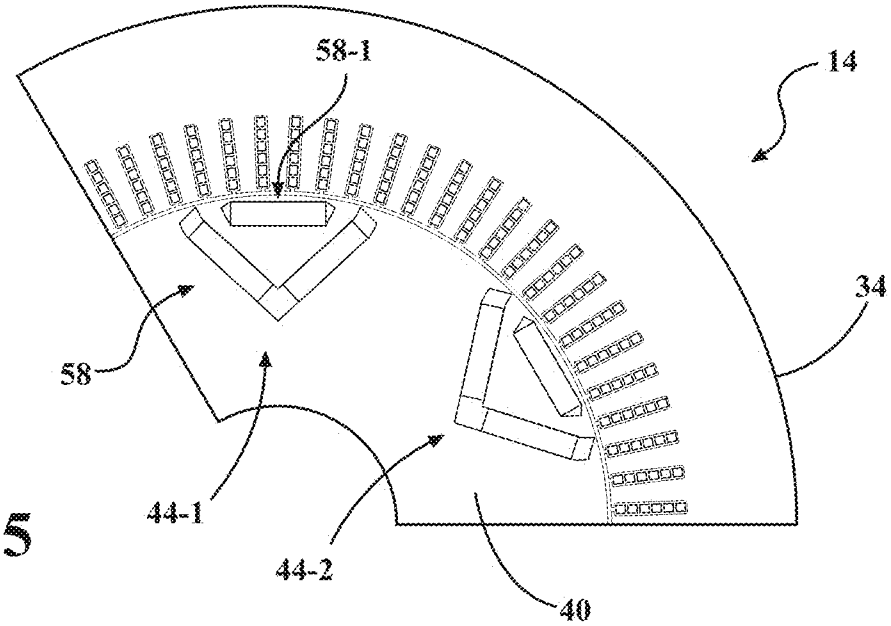
FIG. 5 is a schematic front view of another embodiment of the variable-pole radial flux electric machine shown in FIG. 2, depicting alternating high-coercivity magnets and low-coercivity magnets arranged in a Δ-shape, according to another embodiment of the disclosure.

As shown in FIGS. 3-5, each magnetic pole 44 may include a plurality of permanent magnets 52. The relatively high-coercivity magnet poles 44-1 and the relatively low-coercivity magnet poles 44-2 may have a symmetrical configuration 54. In other words, the individual arrangement and size of the constituent permanent magnets in each pole 44 may be substantially identical. Specifically, as shown in FIG. 4, the magnetic poles 44 may be defined by permanent magnets 52 arranged in a U-shape 56. Such a U-shape 56 may be characterized by a flat portion 56-1 generated by at least one of the constituent permanent magnets 52 arranged distally or away from the airgap 43. Alternatively, as shown in FIG. 5, the magnetic poles 44 may be defined by permanent magnets 52 arranged in a Δ-shape 58 having a flat portion 58-1 arranged proximate or closer to the airgap 43.

Figure 6:
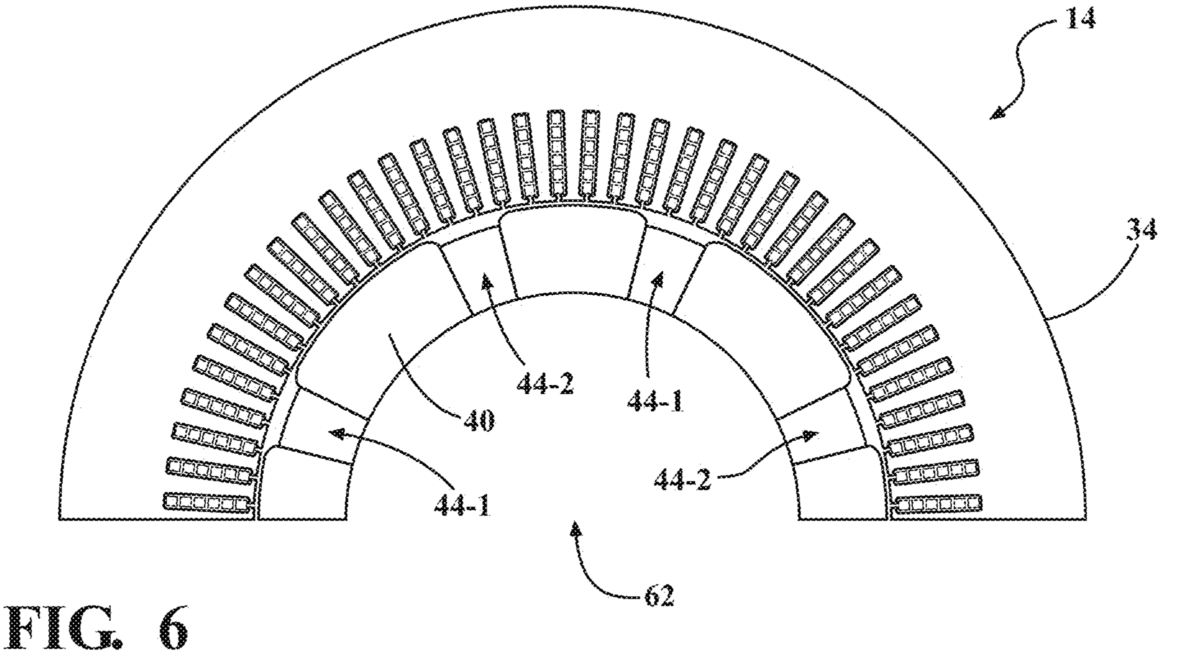
FIG. 6 is a schematic front view of another embodiment of the variable-pole radial flux electric machine shown in FIG. 2, depicting alternating high-coercivity magnets and low-coercivity magnets having an asymmetric spoke arrangement with distinct spacing between individual magnets in alternating poles, according to another embodiment of the disclosure.
Figure 7:
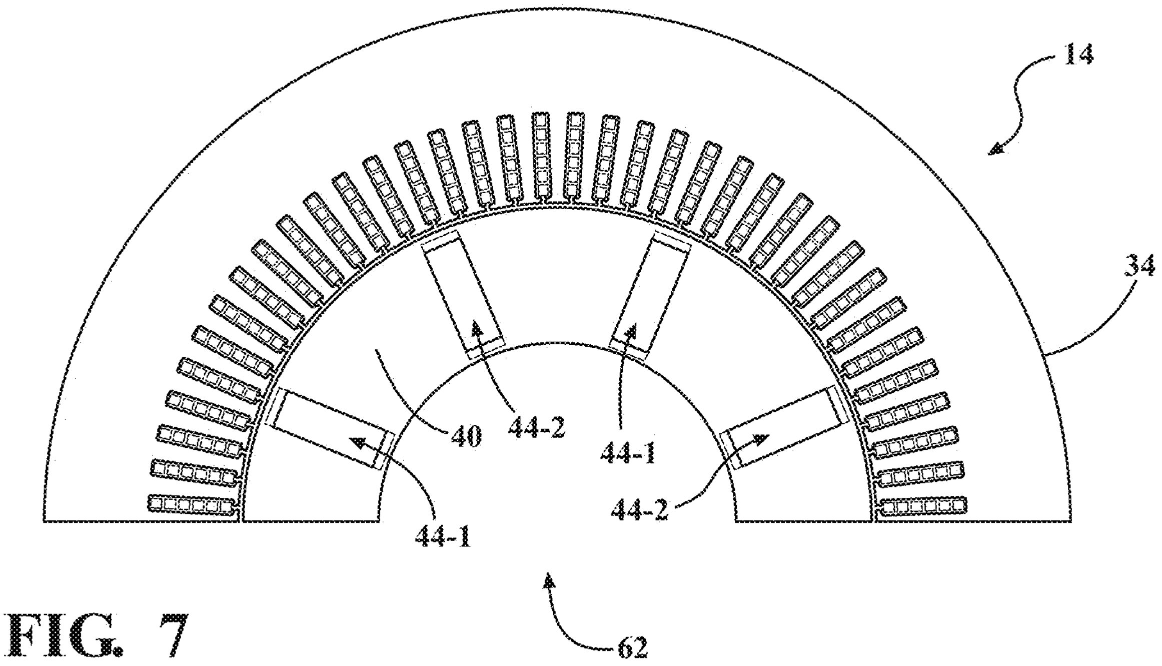
FIG. 7 is a schematic front view of another embodiment of the variable-pole radial flux electric machine shown in FIG. 2, depicting alternating high-coercivity magnets and low-coercivity magnets having a symmetric spoke arrangement with distinct dimensions of individual magnets in alternating poles, according to another embodiment of the disclosure.

In another embodiment, as shown in FIG. 3, the magnetic poles 44 may be defined by permanent magnets 52 arranged in a V-shape 60, with the opening of the V being arranged proximate to the airgap 43. In a separate embodiment, the relatively high-coercivity magnet poles 44-1 and the relatively low-coercivity magnet poles 44-2 may have either a spatially or dimensionally asymmetrical configuration 62 (shown respectively in FIG. 6), where positioning of individual permanent magnets 52 or magnet dimensions in the respective alternating poles is distinct from an analogous magnet in a neighboring pole. Such an asymmetric configuration 62 may be employed to facilitate ease of pole changeover by reducing excitation effort, i.e., the magnitude of the required d-axis stator current ($i_d$), and to optimize torque ripple in the electric machine 14. As shown in FIGS. 6 and 7, the permanent magnets 52 in the alternating magnetic poles 44 may be arranged in a spoke pattern.

The torque regulation system 28 may include a specifically adapted multiphase power inverter 64 (shown in FIG. 2) with integral power modules and switches for supplying direct-axis current ($i_d$) to the stator windings 38A for pole changeover. The direct-axis current ($i_d$) required for pole changeover may be up to 3 times greater than peak alternating current at maximum output torque $T_1$ of the electric machine 14. The multiphase power inverter 64 may be configured, and regulated by the electronic controller 26, to generate the direct-axis current ($i_d$) for at least 1 millisecond. For example, the inverter power modules may be adapted for a 1 millisecond transient pole changeover operation with a thermal impedance that is at least 10 times lower than impedance required for typical 10 microsecond electric motor operation. Such reduced impedance would permit the inverter 64 to generate the requisite direct-axis current ($i_d$) (up to 3 times the peak current at maximum output torque $T_1$) for at least 1 millisecond without exceeding the thermal limit of its power switches.

Overall, the rotor variable-pole radial flux electric machine 14 employs relatively high-coercivity magnets in half of its rotor's magnetic poles and relatively low-coercivity magnet poles in the remaining magnetic poles. The high- and low-coercivity magnets are arranged in alternating order around the rotor core and the magnetization direction of the low-coercivity magnets is changed via application of direct-axis current to alter the number of operating magnetic poles to affect a change in motor's maximum rotating speed and torque output. Additionally, the variable-pole radial flux electric machine 14 may use an asymmetrical configuration of its high- and low-coercivity magnets, where the constituent alternating magnets are either distinctly spaced or have distinct dimensions to facilitate ease of pole changeover. When used for propulsion of a motor vehicle and managed by an electronic controller, such a shift in the electric machine's configuration permits the machine to generate an effective gear ratio change during vehicle operation.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A torque regulation system comprising:
- a variable-pole radial flux electric machine including:
  - a stator having a radially inner stator surface and stator windings arranged thereon; and
  - a rotor mounted inside the stator and configured to rotate relative thereto about a rotational axis, wherein the rotor includes:
    - a rotor core defined by a rotor outer surface establishing an airgap between the rotor and the stator and having multiple adjacent rotor laminations arranged along the rotational axis;
    - an N-number of magnetic poles each having at least one permanent magnet set in the rotor core and configured to generate magnetic flux;
    - wherein:
      - an N/2-number of the magnetic poles includes relatively high-coercivity magnets resistant to change of magnetization direction;
      - an N/2-number of the magnetic poles includes relatively low-coercivity magnets having variable direction of magnetization, wherein full magnetization of the relatively low-coercivity magnets is achieved at a density of the magnetic flux that is lower than magnetic flux density required for saturation of the rotor laminations; and
      - the magnetic poles having the relatively high-coercivity magnets and the magnetic poles having the relatively low-coercivity magnets are arranged in alternating order around the rotor core; and
- an electronic controller configured to regulate operation of the variable-pole radial flux electric machine and change magnetization direction of the relatively low-coercivity magnets via application of direct-axis current ($i_d$) thereto to thereby alter the number of magnetic poles operating in the electric machine.

2. The torque regulation system according to claim 1, wherein the electronic controller is configured to reverse magnetization direction of the relatively low-coercivity magnets from being aligned with the magnetization direction of the relatively high-coercivity magnets via application of a positive direct-axis current ($i_d$) thereto and thereby reduce the number of magnetic poles operating in the electric machine from N to N/2.

3. The torque regulation system according to claim 2, wherein the electronic controller is configured to return magnetization direction of the relatively low-coercivity magnets to being aligned with the magnetization direction of the relatively high-coercivity magnets via application of a negative direct-axis current ($i_d$) thereto and thereby increase the number of magnetic poles operating in the electric machine from N/2 to N.

4. The torque regulation system according to claim 1, wherein the electronic controller is configured to change the magnetization direction of the relatively low-coercivity magnets based on a predetermined torque output of the electric machine.

5. The torque regulation system according to claim 1, wherein the electronic controller is configured to change the magnetization direction of the relatively low-coercivity magnets based on a predetermined rotating speed of the electric machine.

6. The torque regulation system according to claim 1, wherein the coercivity of each relatively high-coercivity magnet is greater than or equal to 1000 kA/m and the coercivity of each relatively low-coercivity magnet is less than or equal to 520 kA/m.

7. The variable-pole radial flux electric machine according to claim 1, wherein the magnetic poles having the relatively high-coercivity magnets and the magnetic poles having the relatively low-coercivity magnets have an asymmetrical configuration.

8. The torque regulation system according to claim 1, wherein each magnetic pole includes a plurality of permanent magnets and is defined by a U-shape characterized by a flat portion generated by at least one of the constituent permanent magnets.

9. The torque regulation system according to claim 1, wherein each magnetic pole includes a plurality of permanent magnets and is defined by a Δ-shape having a flat portion arranged proximate the airgap.

10. A motor vehicle comprising:
- a variable-pole radial flux electric machine configured to generate torque and operable to provide an effective gear ratio change for propulsion of the motor vehicle, the variable-pole radial flux electric machine including:
  - a stator having a radially inner stator surface and stator windings arranged thereon; and
  - a rotor mounted inside the stator and configured to rotate relative thereto about a rotational axis, wherein the rotor includes:
    - a rotor core defined by a rotor outer surface establishing an airgap between the rotor and the stator and having multiple adjacent rotor laminations arranged along the rotational axis;
    - an N-number of magnetic poles each having at least one permanent magnet set in the rotor core and configured to generate magnetic flux;
    - wherein:
      - an N/2-number of the magnetic poles includes relatively high-coercivity magnets resistant to change of magnetization direction;
      - an N/2-number of the magnetic poles includes relatively low-coercivity magnets having variable direction of magnetization, wherein full magnetization of the relatively low-coercivity magnets is achieved at a density of the magnetic flux that is lower than magnetic flux density required for saturation of the rotor laminations; and
      - the magnetic poles having the relatively high-coercivity magnets and the magnetic poles having the relatively low-coercivity magnets are arranged in alternating order around the rotor core; and
- an electronic controller configured to regulate operation of the variable-pole radial flux electric machine and change magnetization direction of the relatively low-coercivity magnets via application of direct-axis current ($i_d$) thereto to thereby alter the number of magnetic poles operating in the electric machine and generate the effective gear ratio change during the propulsion.

11. The motor vehicle according to claim 10, wherein the electronic controller is configured to reverse magnetization direction of the relatively low-coercivity magnets from being aligned with the magnetization direction of the relatively high-coercivity magnets via application of a positive direct-axis current ($i_d$) thereto and thereby reduce the number of magnetic poles operating in the electric machine from N to N/2.

12. The motor vehicle according to claim 11, wherein the electronic controller is configured to return magnetization direction of the relatively low-coercivity magnets to being aligned with the magnetization direction of the relatively high-coercivity magnets via application of a negative direct-axis current ($i_d$) thereto and thereby increase the number of magnetic poles operating in the electric machine from N/2 to N.

13. The motor vehicle according to claim 10, wherein the electronic controller is configured to change the magnetization direction of the relatively low-coercivity magnets based on a predetermined torque output of the electric machine.

14. The motor vehicle according to claim 10, wherein the electronic controller is configured to change the magnetization direction of the relatively low-coercivity magnets based on a predetermined rotating speed of the electric machine.

15. The motor vehicle according to claim 10, wherein the coercivity of each relatively high-coercivity magnet is greater than or equal to 1000 kA/m and the coercivity of each relatively low-coercivity magnet is less than or equal to 520 kA/m.

16. The motor vehicle according to claim 10, wherein the magnetic poles having the relatively high-coercivity magnets and the magnetic poles having the relatively low-coercivity magnets have an asymmetrical configuration.

17. The motor vehicle according to claim 10, wherein each magnetic pole includes a plurality of permanent magnets and is defined by a U-shape characterized by a flat portion generated by at least one of the constituent permanent magnets.

18. A variable-pole radial flux electric machine comprising:
- a stator having a radially inner stator surface and stator windings arranged thereon; and
- a rotor mounted inside the stator and configured to rotate relative thereto about a rotational axis, wherein the rotor includes:
  - a rotor core defined by a rotor outer surface establishing an airgap between the rotor and the stator and having multiple adjacent rotor laminations arranged along the rotational axis;
  - an N-number of magnetic poles each having at least one permanent magnet set in the rotor core and configured to generate magnetic flux;
  - wherein:
    - an N/2-number of the magnetic poles includes relatively high-coercivity magnets resistant to change of magnetization direction;
    - an N/2-number of the magnetic poles includes relatively low-coercivity magnets having variable direction of magnetization, wherein full magnetization of the relatively low-coercivity magnets is achieved at a density of the magnetic flux that is lower than magnetic flux density required for saturation of the rotor laminations; and
    - the magnetic poles having the relatively high-coercivity magnets and the magnetic poles having the relatively low-coercivity magnets are arranged in alternating order around the rotor core; and
    - magnetization direction of the relatively low-coercivity magnets is changed via application of direct-axis current ($i_d$) thereto which alters the number of magnetic poles operating in the electric machine.

19. The variable-pole radial flux electric machine according to claim 18, wherein each magnetic pole includes a plurality of permanent magnets and is defined by a U-shape characterized by a flat portion generated by at least one of the constituent permanent magnets.

20. The variable-pole radial flux electric machine according to claim 18, wherein each magnetic pole includes a plurality of permanent magnets and is defined by a Δ-shape having a flat portion arranged proximate the airgap.

* * * * *